United States Patent [19]
Lyles et al.

[11] Patent Number: 5,836,412
[45] Date of Patent: Nov. 17, 1998

[54] METHOD OF ASSEMBLING A GOLF CAR

[75] Inventors: Thomas W. Lyles, Martinez; Robert A. Courtwright, Evans; Daniel C. Allen, Martinez; Edgar Grigsby, Jr., Augusta, all of Ga.

[73] Assignee: Textron, Inc., Providence, R.I.

[21] Appl. No.: 156,811

[22] Filed: Nov. 22, 1993

[51] Int. Cl.⁶ .................................................. B21D 39/00
[52] U.S. Cl. .................................. 180/65.1; 280/DIG. 5; 29/430
[58] Field of Search ............... 280/DIG. 5; 29/401.1, 29/430, 469, 525.1; 296/901; 180/65.1

[56] References Cited

U.S. PATENT DOCUMENTS

| | | | |
|---|---|---|---|
| 3,108,481 | 10/1963 | Westmont | 280/DIG. 5 |
| 3,199,621 | 8/1965 | Seaman | 280/DIG. 5 |
| 3,596,979 | 8/1971 | Hablitzel | 296/901 |
| 3,608,659 | 9/1971 | Gardner | 280/DIG. 5 |
| 3,968,559 | 7/1976 | Karlsson | 29/430 |
| 4,711,467 | 12/1987 | Link et al. | 29/430 |
| 4,811,473 | 3/1989 | Link | 29/430 |
| 4,821,827 | 4/1989 | Reese | 280/DIG. 5 |
| 4,930,591 | 6/1990 | Lanius et al. | 280/DIG. 5 |
| 5,238,267 | 8/1993 | Hutchison et al. | 296/901 |

FOREIGN PATENT DOCUMENTS 87038476  7/1987  WIPO ....................................... 29/469

*Primary Examiner*—Brian L. Johnson
*Assistant Examiner*—Gary Savitt
*Attorney, Agent, or Firm*—Perman & Green, LLP

[57] ABSTRACT

A method of assembling either an electric motor powered car or an internal combustion engine powered car along a single assembly line. The method comprises providing a car chassis having a general block shaped drive system receiving area and, selecting a drive system from a group consisting of an electric motor drive system and an internal combustion engine drive system. The method then comprises connecting the selected drive system to the chassis in the drive system receiving area.

7 Claims, 14 Drawing Sheets

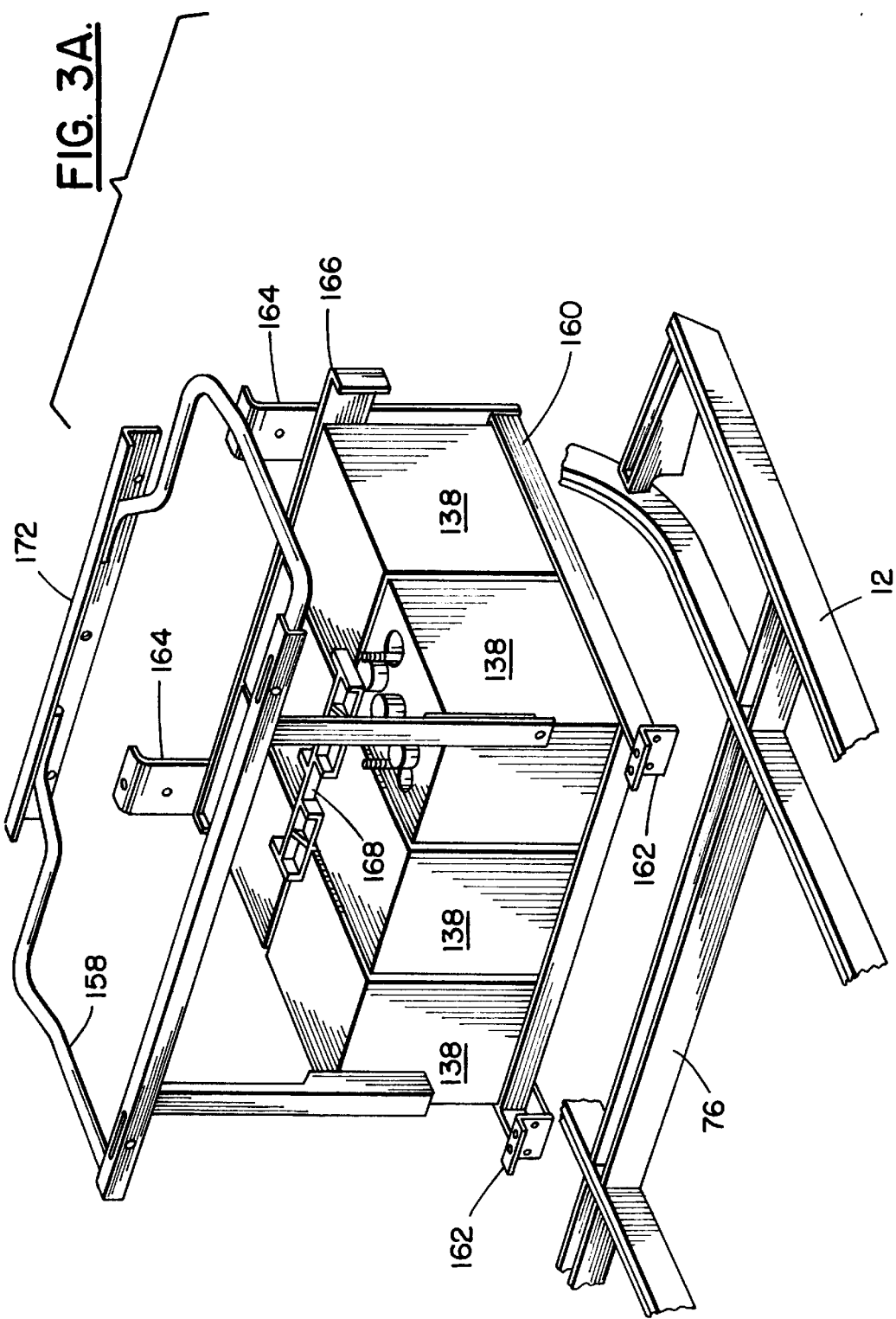

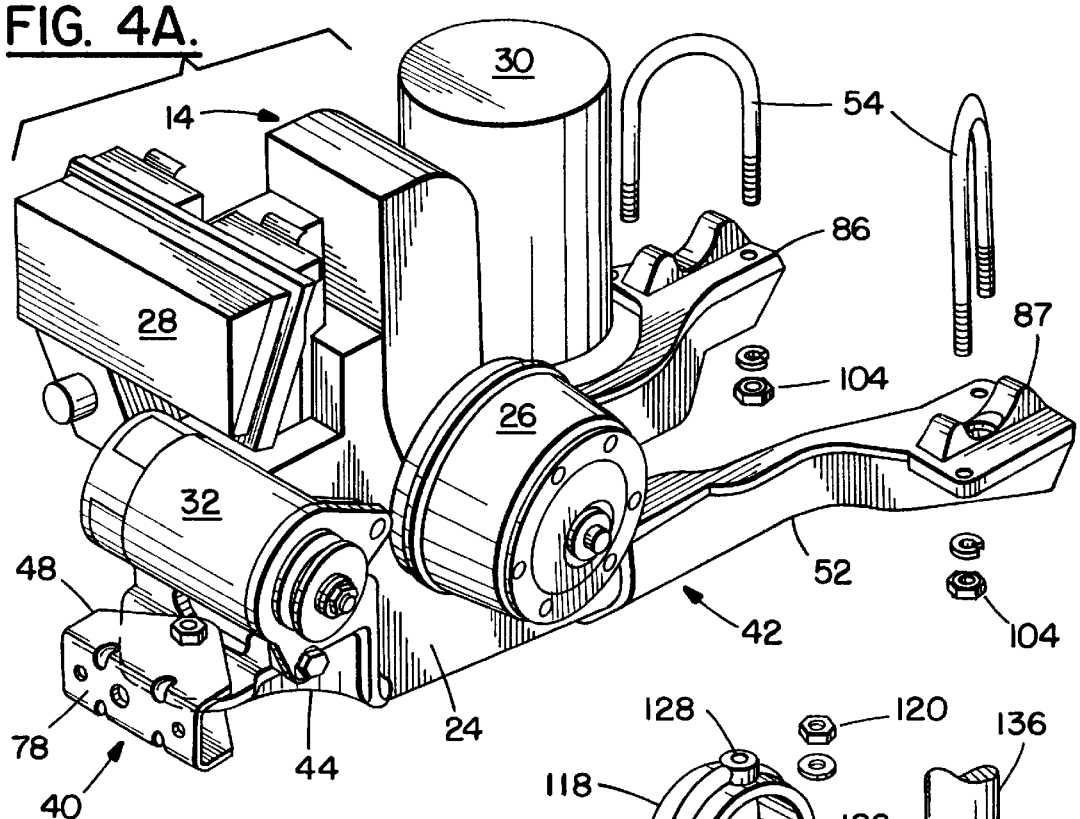
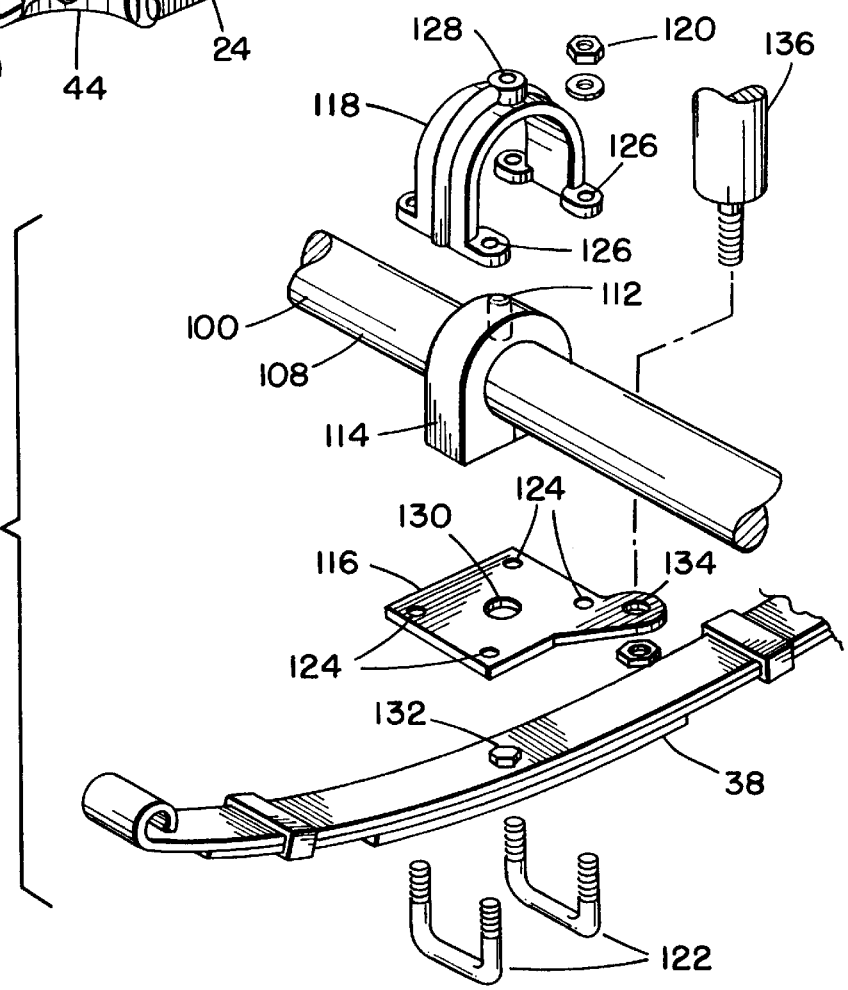

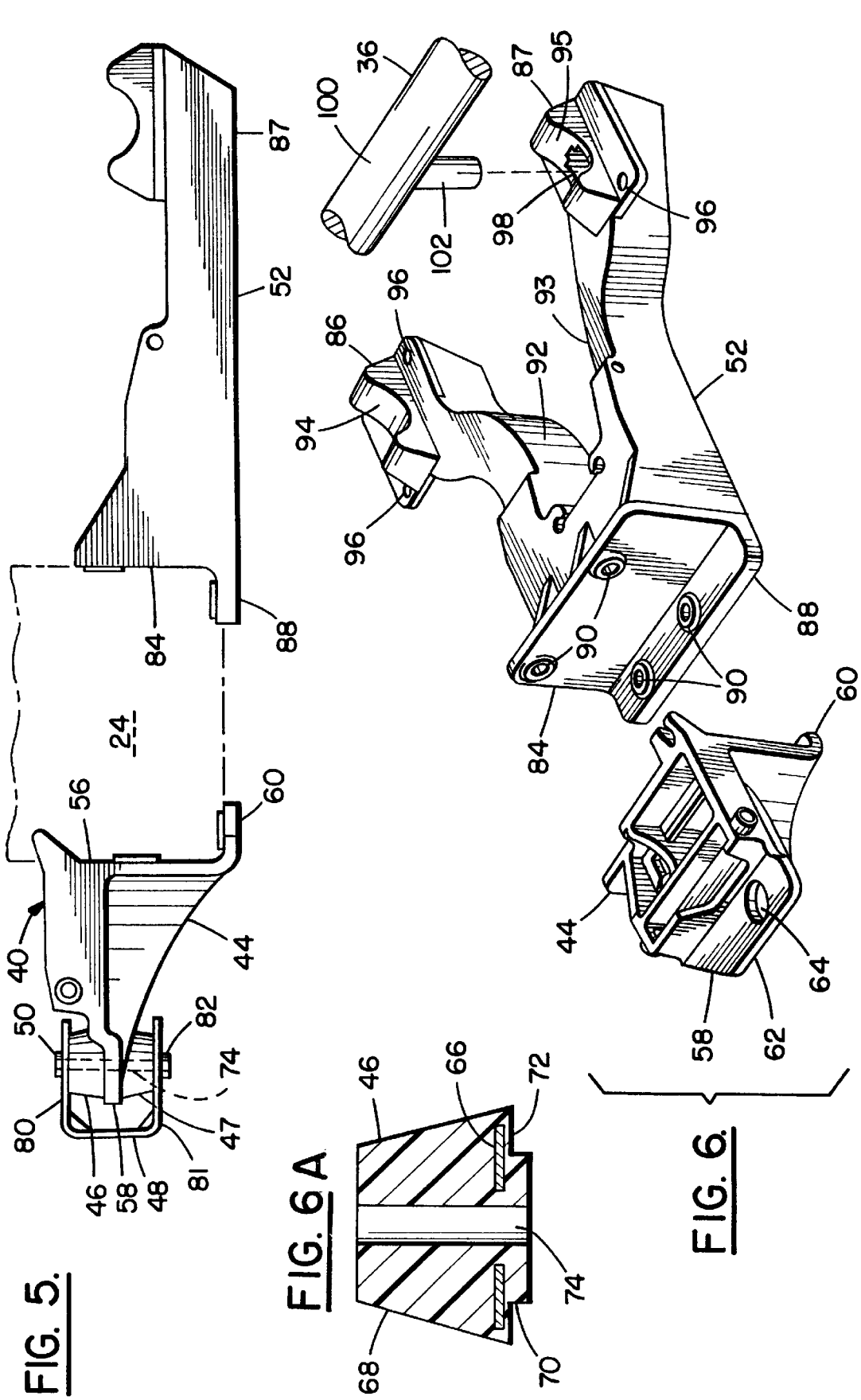

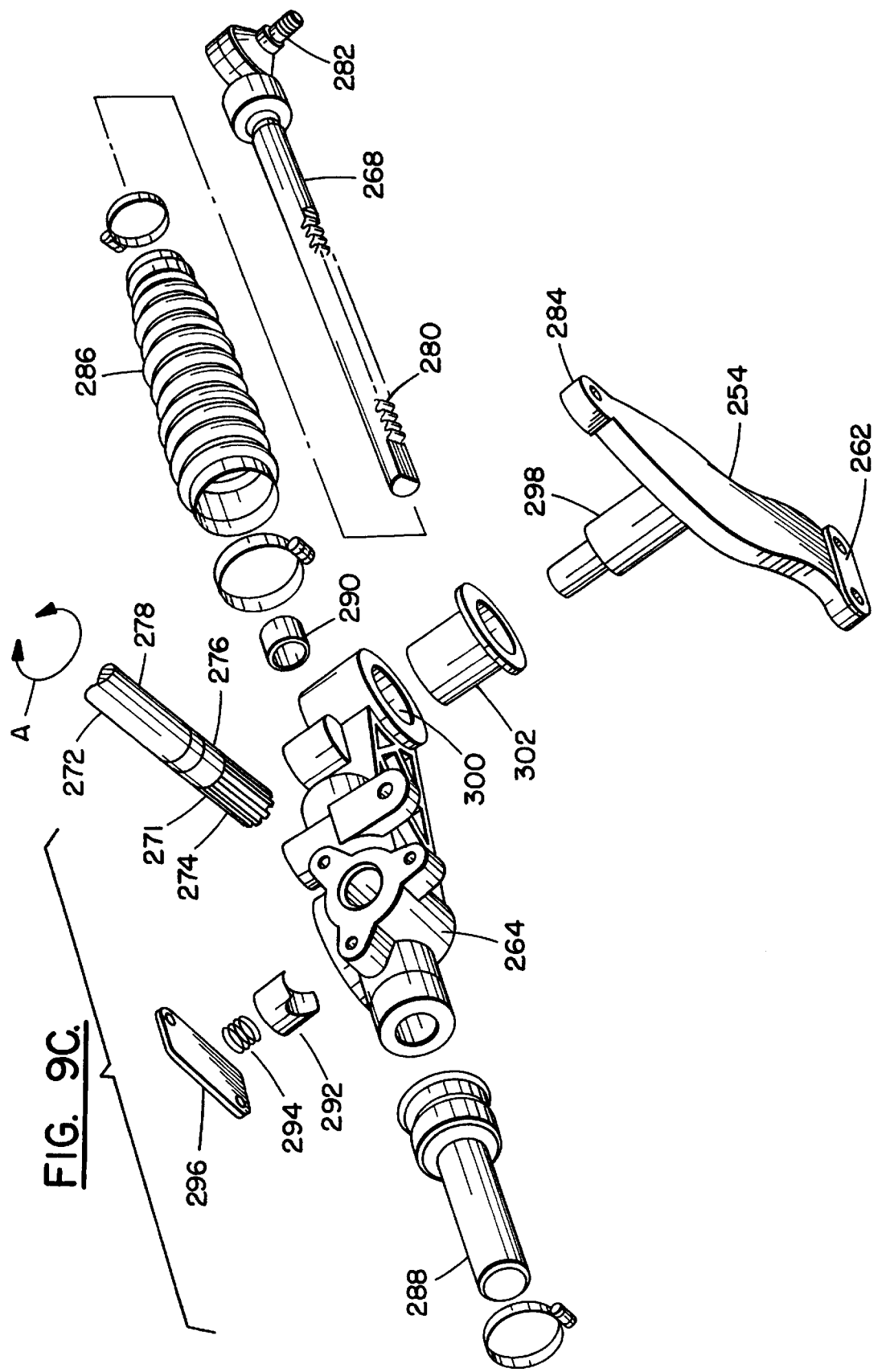

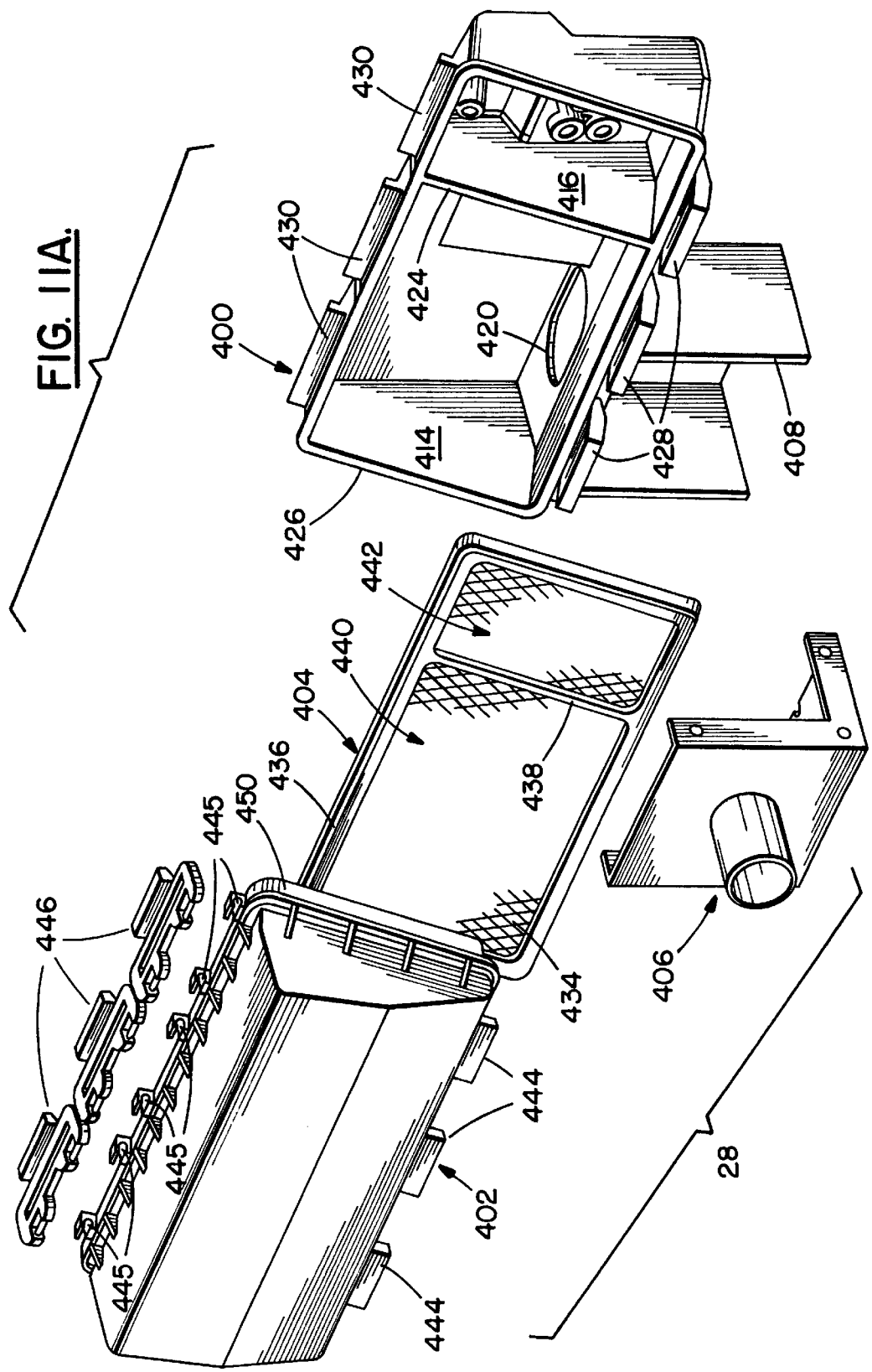

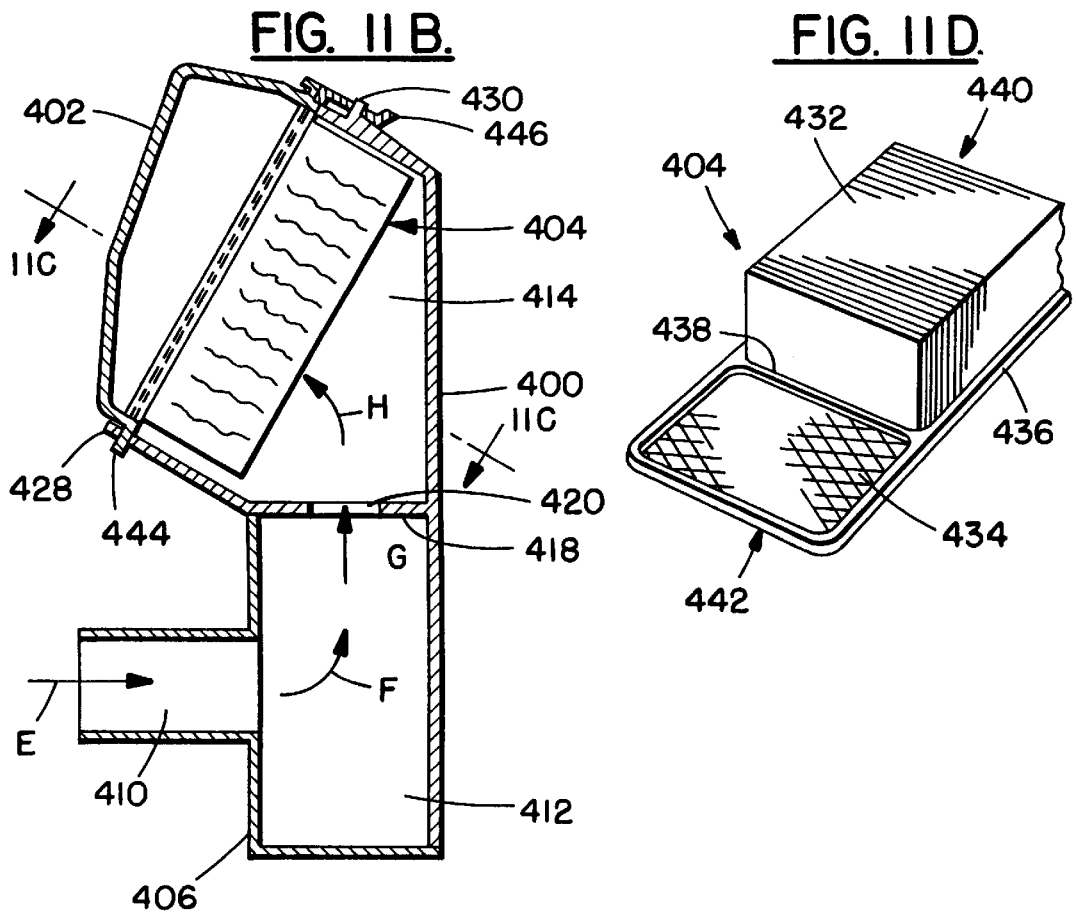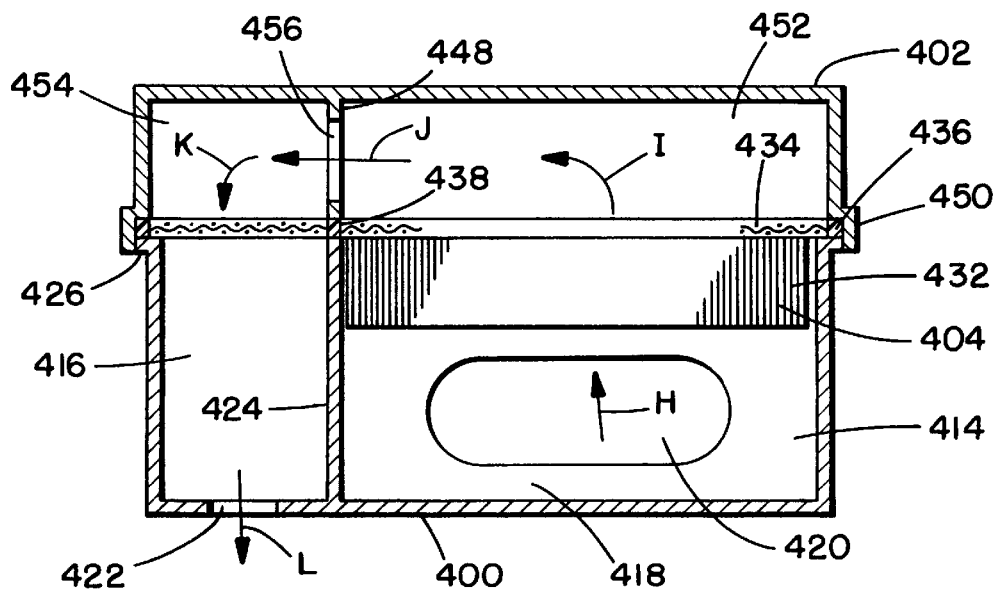

METHOD OF ASSEMBLING A GOLF CAR

BACKGROUND OF THE INVENTION

1. Field of the Invention

The present invention relates to automobiles and, more particularly, to assembly of automobiles.

2. Prior Art

U.S. Design Pat. Nos. Des. 255,558 and 320,580 disclose exterior designs of two types of golf cars. Golf cars have generally been designed and built to be powered by either an internal combustion engine or an electric motor. The internal combustion engine powered cars are substantially different from the electric powered cars, including differences as basic as their chassis, because of the fundamental differences in the size, shape, and requirements between internal combustion engines and electric motors. In order to conserve materials and because of other reasons, in the past, internal combustion engine powered golf cars and electrical powered golf cars were designed and manufactured to their own specific, separate and different design specification. Virtually no major components, except perhaps for tires and exterior body parts, were interchangeable between electric and internal combustion engine powered cars during the initial assembly process.

It is the objective of the present invention to provide a new and improved method of assembling cars.

SUMMARY OF THE INVENTION

In accordance with one method of the invention, a method of assembling a golf car is provided comprising steps of providing a golf car chassis having a general block shaped drive system receiving area; selecting a type of drive system from a group of drive system types consisting of an electric motor drive system and an internal combustion engine drive system; and connecting the selected type of drive system to the chassis in the drive system receiving area.

In accordance with another embodiment of the present invention, a steering system for a car is provided comprising a rack and pinion housing, a steering shaft assembly, a driven rack assembly, and an idler lever. The rack and pinion housing has a unitary idler lever mount. The steering shaft assembly is connected to the housing and has a pinion gear located in the housing. The driven rack assembly is operably connected to the pinion gear and extends out of the housing. The idler lever is pivotally mounted to the housing at the idler lever mount and, has the driven rack assembly attached thereto.

In accordance with another embodiment of the present invention, a rack and pinion steering system for a car is provided having a rack and pinion housing, a rack and pinion assembly with a driven rack connected to a tie rod lever, the improvement comprising the rack and pinion housing having the idler lever directly pivotally mounted thereto.

In accordance with another embodiment of the present invention, an air intake system for an internal combustion engine is provided comprising a housing and an air filter. The housing has an air inlet, an air outlet and an air conduiting path therebetween. The air conduiting path includes an air filter receiving area and means for changing air flow direction and velocity at least four times each along the path. The air filter is located in the air filter receiving area.

In accordance with another embodiment of the present invention, an air filter for an internal combustion engine is provided comprising filter element means, a substantially flat support, and a seal. The substantially flat support is connected to one side of the filter element means and has apertures therethrough to allow air to pass through the support. The seal is connected to a perimeter of the flat support.

BRIEF DESCRIPTION OF THE DRAWINGS

The foregoing aspects and other features of the invention are explained in the following description, taken in connection with the accompanying drawings, wherein:

FIG. 3A is an exploded perspective view of part of the chassis shown in FIG. 3 showing connection of the batteries to the chassis by a battery support structure;

FIG. 4A is a perspective view of the engine assembly shown in FIG. 2;

FIG. 4B is an exploded perspective view of a mount of leaf springs and shock absorber to the rear axle assembly shown in FIG. 2;

FIG. 5 is an elevational side view of the front engine mount rear engine mount shown in FIG. 4A;

FIG. 6 is a perspective view of the front load bearing engine tie member and the rear load bearing engine tie member shown in FIGS. 4A and 5;

FIG. 6A is a cross sectional view of an isolator of the front engine mount shown in FIG. 5;

FIG. 9C is an exploded perspective view of the rack and pinion assembly shown in FIG. 9B;

FIG. 11A is an exploded perspective view of the air filter assembly used with the internal combustion engine shown in FIG. 4A;

FIG. 11B is a cross-sectional view of the air filter assembly shown in FIG. 11A;

FIG. 11C is a cross-sectional view of the air filter assembly taken along line C—C in FIG. 11B; and FIG. 11D is a partial perspective view of the air filter used in the air filter assembly shown in FIG. 11A.

DETAILED DESCRIPTION OF THE INVENTION

Figure 1:
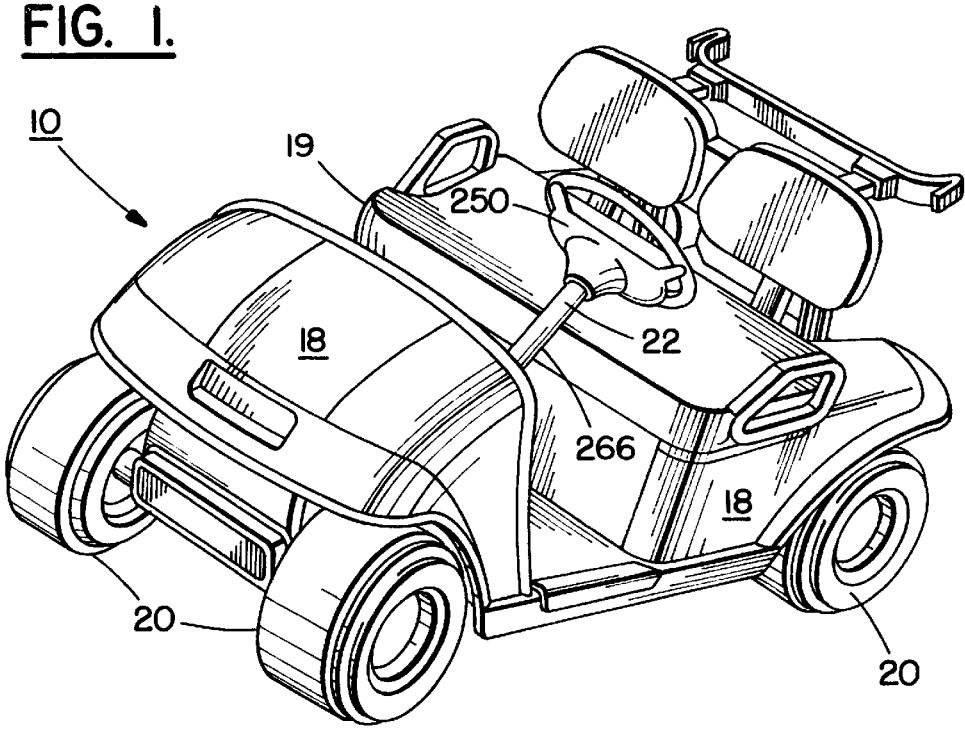
FIG. 1 is a perspective view of a golf car incorporating features of the present invention.
Figure 2:
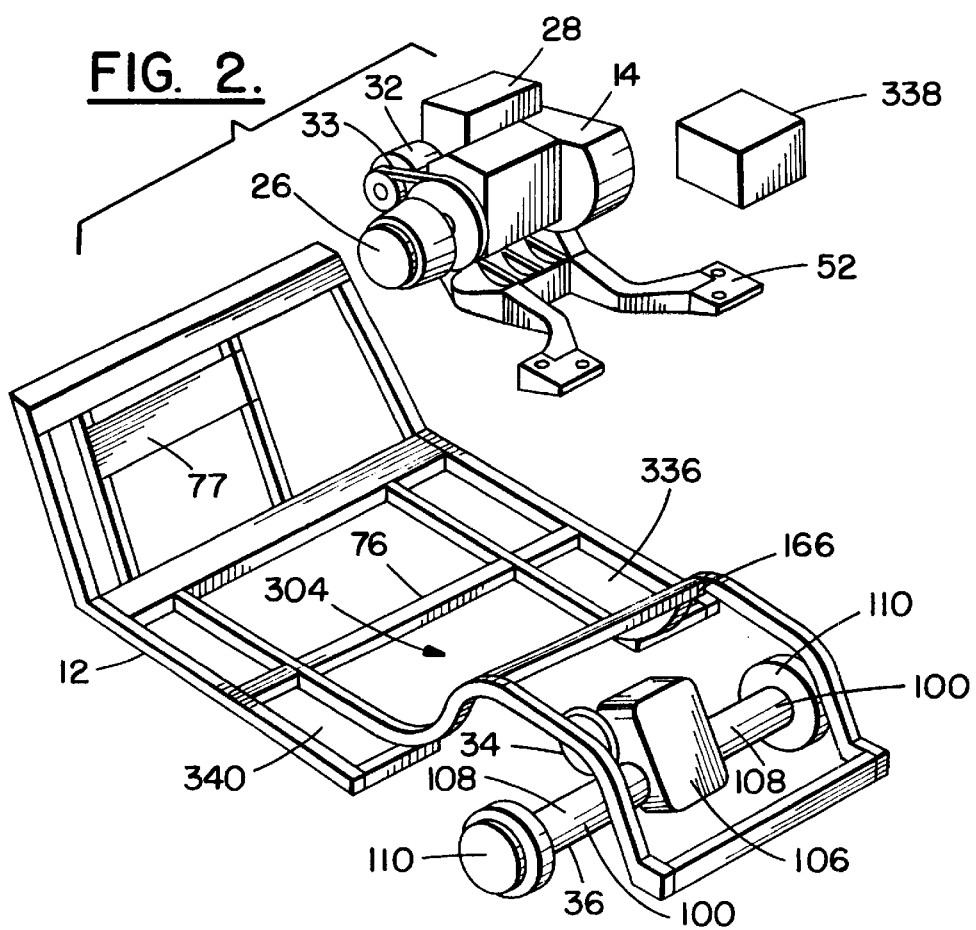
FIG. 2 is an exploded perspective view of a chassis, engine, and rear axle assembly for an internal combustion engine powered car.
Figure 3:
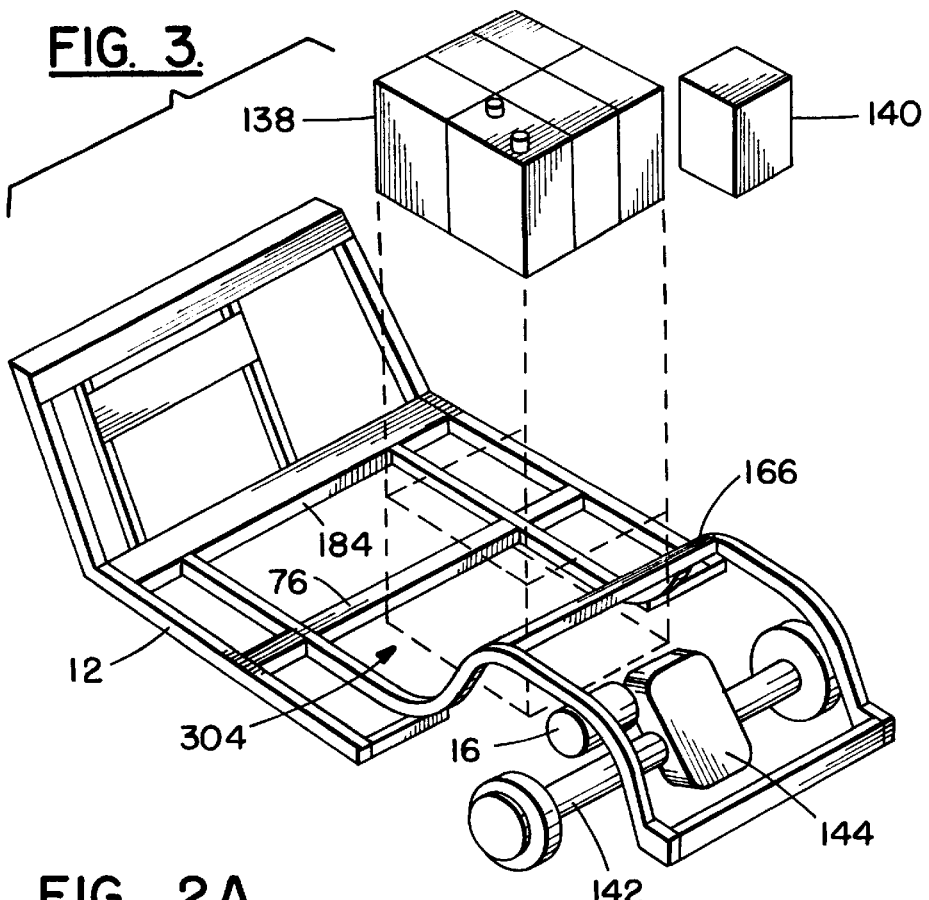
FIG. 3 is an exploded perspective view of the chassis as shown in FIG. 2 with a set of batteries, an electric motor, and a rear axle assembly of an electric powered car.

Referring to FIG. 1, there is shown a perspective view of a golf car 10 incorporating features of the present invention. Although the present invention will be described with reference to a golf car, it should be understood that features of the present invention can be embodied in other types of cars and automobiles including other types of turf vehicles. Referring also to FIGS. 2 and 3, the car 10 generally comprises (among other things) a chassis 12, a drive system, body parts 18, tires 20, brakes (not shown), and a steering system 22. The car 10 can have either an internal combustion engine drive system or an electric powered drive system. FIG. 2 shows the chassis 12 and internal combustion engine 14 for the internal combustion engine powered car. As used herein, the term "internal combustion engine" is intended to include any suitable type internal combustion engine powered by any suitable type of fuel, such as gasoline, natural gas, hydrogen, etc. FIG. 3 shows the chassis 12 and electric motor 16 for the electric powered car. The electric motor 16 can be powered by any suitable type of power source, such as batteries, solar panels, etc.

Referring particularly to FIGS. 2, 4A, 5 and 6, the mounting of the internal combustion engine drive system to the chassis 12 will be described. The engine 14, in the embodiment shown, is a four cycle engine with an engine block 24. However, any suitable type of engine could be used. The engine 14 has a drive clutch assembly 26 connected to an output shaft of the engine 14, an air filter assembly 28, a muffler 30, and an electric starter/generator 32. A belt 33 connects the starter/generator 32 to the drive clutch assembly 26. Another belt (not shown) connects the drive clutch assembly 26 to a driven clutch assembly 34 on the rear axle assembly 36. This type of belt transmission is well known, as shown by U.S. Pat. No. 3,727,478, and has been used in golf cars for many years.

The car also comprises an engine mounting system for mounting the engine 14 to the chassis 12. As seen in FIGS. 4A and 4B, the engine mounting system generally comprises two sets of leaf springs 38 (only one of which is shown), shock absorbers 136 (only one of which is shown), a front engine mount 40, and a rear engine mount 42. As seen in FIG. 5, the front mount 40 includes a single first load bearing tie member or frame member 44, a pair of isolators 46, 47, a C-shaped member 48, and a bolt 50. The rear engine mount 42 generally includes a single second load bearing tie member or frame member 52, and two U-shaped bolts 54 (see FIG. 4A). The members 44 and 52 are referred to as tie members herein because they function as a link that connect or hold together parts of the car 10 as further understood below.

Referring primarily to FIGS. 4A, 5 and 6, the first tie member 44 is preferably comprised of cast metal with a first end 56 and an opposite second end 58. The starter/generator 32 is directly attached on top of the first tie member 44. The first end 56 has a bottom shelf 60 and is suitably sized and shaped to be fixedly mounted to a front end of the engine block 24. Bolts (not shown) are used to attach the first tie member 44 directly to the engine block 24. The second end 58 has a flat section 62 with an enlarged hole 64 therethrough. The isolators 46, 47, in the embodiment shown, are identical to each other. As shown in FIG. 6A, the isolator 46 generally comprises a metal ring 66 encased with a body 68 made of resilient elastomeric material. The isolator 46 has a first section 70 that is positioned into the enlarged hole 64. A ledge 72 sits on the surface of the flat section 62. Hole 74 is provided to allow the bolt 50 to pass through the isolator 46. The two isolators 46, 47 are positioned on opposite sides of the flat section 62 with their first sections 70 in the hole 64. The C-shaped member 48 is connected to a transverse section 76 of the chassis 12 (see FIG. 2) by bolting the center span 78 of the member 48 to the transverse section 76. The isolators 46, 47 and flat section 62 of the first tie member 44 are positioned into the C-shaped member 48 between its opposing top and bottom ends 80, 81. The bolt 50 is passed through holes in the ends 80, 81, through the holes 74 in the isolators 46, 47, and through hole 64 in the first tie member 44. A nut 82 is attached to the bolt 50 and tightened. This arrangement allows the first tie member 44 to pivot in three orthogonal axes relative to the transverse section 76 of the chassis 12 by elastic deformation of the isolators. However, the bolt 50 insures that the first tie member 44 will not detach from the transverse section 76. In alternate embodiments, other types of members or connections could be provided.

The second tie member 52 is also preferably comprised of cast metal. The second tie member 52 has a first end 84 and an opposite second end with two spaced apart second end portions 86, 87. The first end 84 has a bottom shelf 88 and is suitably sized and shaped to be connected to a rear end of the engine block 24. Holes 90 are provided to accommodate bolts (not shown) to directly rigidly attach the first end 84 to the rear of the engine block 24. The second tie member 52 has a general Y-shape with two leg sections 92, 93 extending from the first end 84 to the two spaced apart second end portions 86, 87. The second end portions 86, 87 each comprise a seat 94, 95 and two bolt holes 96. The second end portion 87 also has a locator hole 98 in the seat 95. The seats 94, 95 are suitably sized and shaped to receive axle tubes 100 of the rear axle assembly 36 (see FIGS. 2 and 6). One of the axle tubes 100 has a locator section 102 that is positioned into the locator hole 98. The U-shaped bolts 54 (see FIG. 4A) are attached to the second end portions 86, 87, passing through holes 96, by nuts 104. The axle tubes 100 of the rear axle assembly 36 are, therefor, fixedly and stationarily connected to the second tie member 52 by means of the interlocking nature of the locator section 102 in hole 98 and capturing of the tubes 100 in the seats 94, 95 by the U-shaped bolts 54. In alternate embodiments, other types of members or connections could be provided. In a preferred embodiment, a bottom plate (not shown) is connected to the bottom of the members 44, 52 under the engine 14 to prevent debris from contacting the engine.

As seen in FIG. 2, the rear axle assembly 36 includes a gear box 106 having suitable gears to provide for forward, neutral and reverse drive, two axle sections 108 extending from opposite sides of the gear box 106, and hub and brake assemblies 110 at opposite ends of the axle sections 108. The axle tubes 100 are part of the axle sections 108 and are connected to the housing of the gear box 106. The driven clutch assembly 34 is operably connected to gears in the gear box 106. The gears in the gear box 106 are operably connected to the axle inside the tubes 100. The axle is operably connected to the hubs in the hub and brake assemblies 110. The axle tubes 100 also includes an upwardly extending pin section 112 (see FIG. 4B) located proximate to the hub and brake assemblies 110.

Referring particularly to FIG. 4B, the pin sections 112 are used to locate the rear axle assembly 36 relative to the leaf springs 38. Isolators 114 are mounted on the tubes 100 at the pin sections 112. The isolators are comprised of elastic resilient material such as a polymer or rubber. The two mountings of the rear axle assembly 36 to the springs 38 each comprise an isolator 114, a plate 116, a connecting cover 118, two U-shaped bolts 122, and four nuts 120 (only one of which is shown). The connecting cover 118 fits over the top of the isolator 114. The plate 116 is located under the isolator. The springs 38 are located under the plate 116. The U-shaped bolts 122 are located under the springs 38, extend up along the sides of the springs, through holes 124 in the plate 116, through holes 126 in the connecting cover 118, and have the nuts 120 connected to their ends. This assembly connects the rear axle assembly 36 to the springs 38, but also allows the isolator 114 to reduce transmission of vibrations between the springs 38 and rear axle assembly 36 and, provides freedom of motion for the rear axle assembly 36. The plate 116 has a hole 130 to accommodate bolt 132 on the springs 38, and a hole 134 for attaching the bottom of a shock absorber 136 to the plate 116. The top of the shock absorber is connected to the chassis 12. The ends of the leaf springs 38 are also connected to the chassis 12 as is generally known. In alternate embodiments, other types of members or connections could be provided.

The engine mounting system described above has many advantages over prior mounting systems. A three point pivotable mounting of the engine 14 to the chassis 12 is provided. Although the advantages of a three point pivotable mount are well know, the system described above improves this type of mounting. First, the engine 14 is fixedly connected to the rear axle assembly 36 by means of a single load bearing member; the second tie member 52. Because the second tie member 52 is a single member, preferably made of cast metal, it is easy to mass produce with very good quality and consistency. This facilitates connection of the engine 14 to the rear axle assembly 36. Second, because the first tie member 44 is a single member, preferably made of cast metal, it is also easy to mass produce with very good quality, accuracy and consistency. Third, because the first and second tie members 44 and 52 are directly rigidly attached to the engine block 24, they form a rigid unitary assembly. The engine block functions as a structural member to rigidly connect the first and second tie members 44, 52 to each other. Because the second tie member 52 is directly rigidly attached to the rear axle assembly 36, an engine assembly consisting of the engine 14, rear axle assembly 36, and two tie members 44, 52 can be preassembled as a rigid unitary assembly and, inserted and connected to the chassis 12 as a modular unit. Such a modular assembly insures consistent quality of such features as the proper alignment and positioning between the drive and driven clutch assemblies 26, 34, and weight distribution relative to the chassis 12. This is accomplished with a significantly easier and less time consuming assembly process of assembling the engine assembly due to the reduced number of parts involved and simpler connection of those parts to each other without any adjustment, shimming or selective assembly.

Figure 2A:
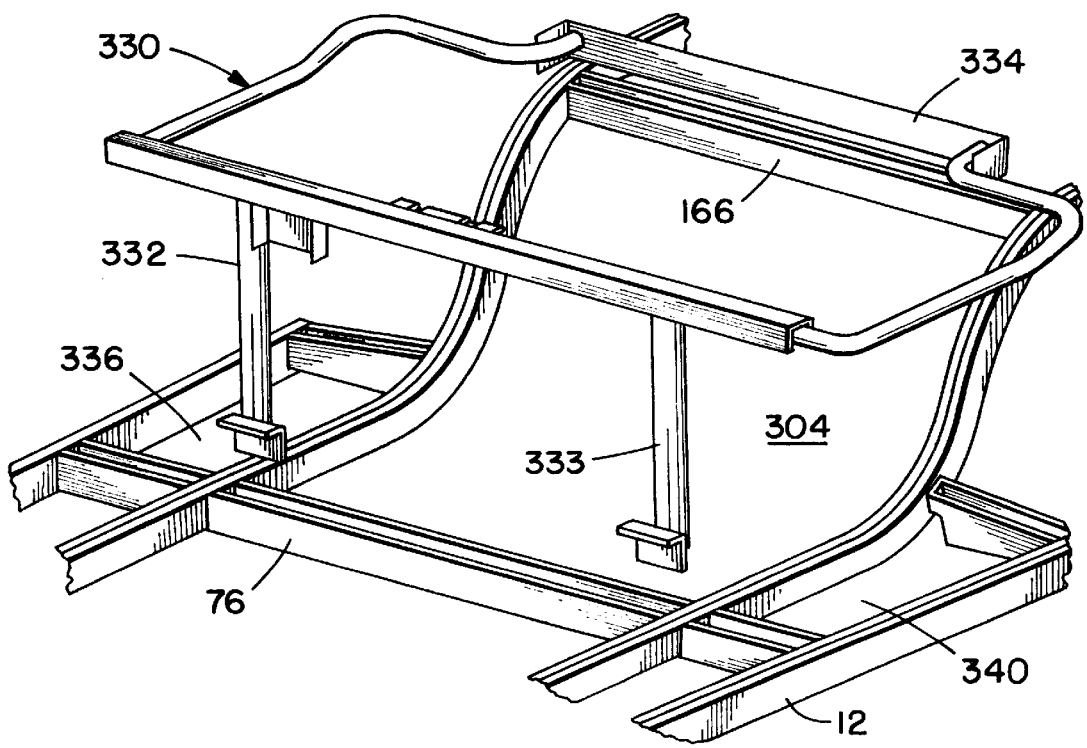
FIG. 2A is a partial perspective view of the chassis shown in FIG. 2 with a seat frame.

Referring to FIG. 2A, for the internal combustion engine powered car, the car includes a seat frame 330 that is connected to the chassis 12 over the drive system receiving area 304. The seat frame 330 incldues two front members 332, 333 attached to the transverse section 76, and a rear section 334 attached to the transverse section 166. The seat 19 (see FIG. 1) is removably supported by the seat frame 330. Area 336 receives a fuel tank 338 (see FIG. 2) and area 340 receives a battery (not shown) used to start and operate the engine 14.

Referring now to FIGS. 11A–11D the air filter assembly 28 with removable air filter 404 is shown. The assembly 28 includes an air filter housing 400, a cover 402, the air filter 404, and an inlet cover 406. The housing 400 and covers 402 and 406 are all preferably made of a molded polymer or plastic material. The housing 400 has an inlet section 408 that has the inlet cover 406 attached to it to form an inlet 410 and first area 412. The housing 400 also has a second area 414 and a third area 416. The inlet 410 forms a first aperture for the assembly 28. A wall 418 between the first and second areas 412, 414 has a second aperture 420. The housing 400 has a third aperture 422 that is attached to the carburetor of the engine 14. A wall 424 separates the second area 414 from the third area 416. The housing 400 has a flange 426 around its perimeter, receiving slots 428 at its bottom, and projections 430 at its top.

The air filter 404 has a filter element 432, a support 434, and a seal 436. The filter element 432 can be made of any suitable material, such as paper. In the embodiment shown, the element 432 has a general rectangular box or block shape. The support 434 is comprised of a substantially flat single screen member. A screen member is used to provide structural rigidity for the air filter, but nonetheless allow air to substantially freely pass through the support 434. The seal 436 is comprised of an elastomeric material with a general rectangular shape and a center section 438. The seal 436 is molded onto the support 434. More specifically, the seal 436 is molded onto the perimeter of the support and across the support 434 at the center section 438. At the same time, or at least substantially the same time, the seal is molded onto the perimeter of the filter element 432 at one side that is adjacent to the support 434. Thus, the seal 436 connects the filter element 432 to the support 434. In the configuration shown, the air filter 404 has a first section 440 comprised of the entire filter element, a first portion of the flat support, and a first portion of the seal. The air filter 404 has a second section 442 comprised of a remaining second portion of the flat support and a second portion of the seal. The remaining third portion of the seal at center section 438 is located at the junction between the first and second sections 440, 442.

The cover 402 has three projections 444 at its base, three snap latches 446 functionally connected to six latch hooks 445 at the top of the cover 402, and an intermediate wall 448. The three projections 444 are located in receiving slots 428 in the housing 400. The three snap latches 446 are snap lock connected to the three projections 430 at the top of the housing 400. A flanged lip 450 surrounds the outer perimeter of the cover 402. The intermediate wall 448 establishes a fourth area 452 and a fifth area 454 and, has a fourth aperture 456. The snap latches 446 can be released to remove the cover 402 from the housing 400 for replacement of the air filter 404.

As seen best in FIGS. 11B and 11C, the seal 436 is compressively sandwiched between the housing 400 and cover 402 between flange 426 and flanged lip 450 at the seal's perimeter and, between the wall 424 and wall 448 at center section 438. The filter element 432 is located in the second area 414. The assembly 28 provides a unique air flow path which, through multiple changes in air flow direction and velocity through apertures helps to control harmonic waves. Air enters the assembly 28 as shown by arrow E through the aperture of the inlet 410 and into the larger first area 412. The air has to change direction as indicated by arrow F in order to pass through the second aperture 420 as indicated by arrow G. Then, when the air enters second area 414 it has to change direction again to pass through the filter element 432 as indicated by arrow H. After the air passes through the filter element 432 and support screen 434 it enters the fourth area 452 and changes direction again as indicated by arrow I. The air passes through aperture 456 as indicated by arrow J. The air enters the fifth area 454 and changes direction again as indicated by arrow K. The air passes through the support screen 434 into third area 416. The air then exits the assembly 28 through the third aperture 422 as indicated by arrow L into the carburetor inlet. The combination of the four directional changes F, H, I, K, the velocity changes caused by passage of the air through narrowed passages 410, 420, 456, 422 and filter element 432, and the baffling effect of the walls 448, 418 all combine to control harmonic waves to a non-audible, non-influencing frequency.

Figure 8:
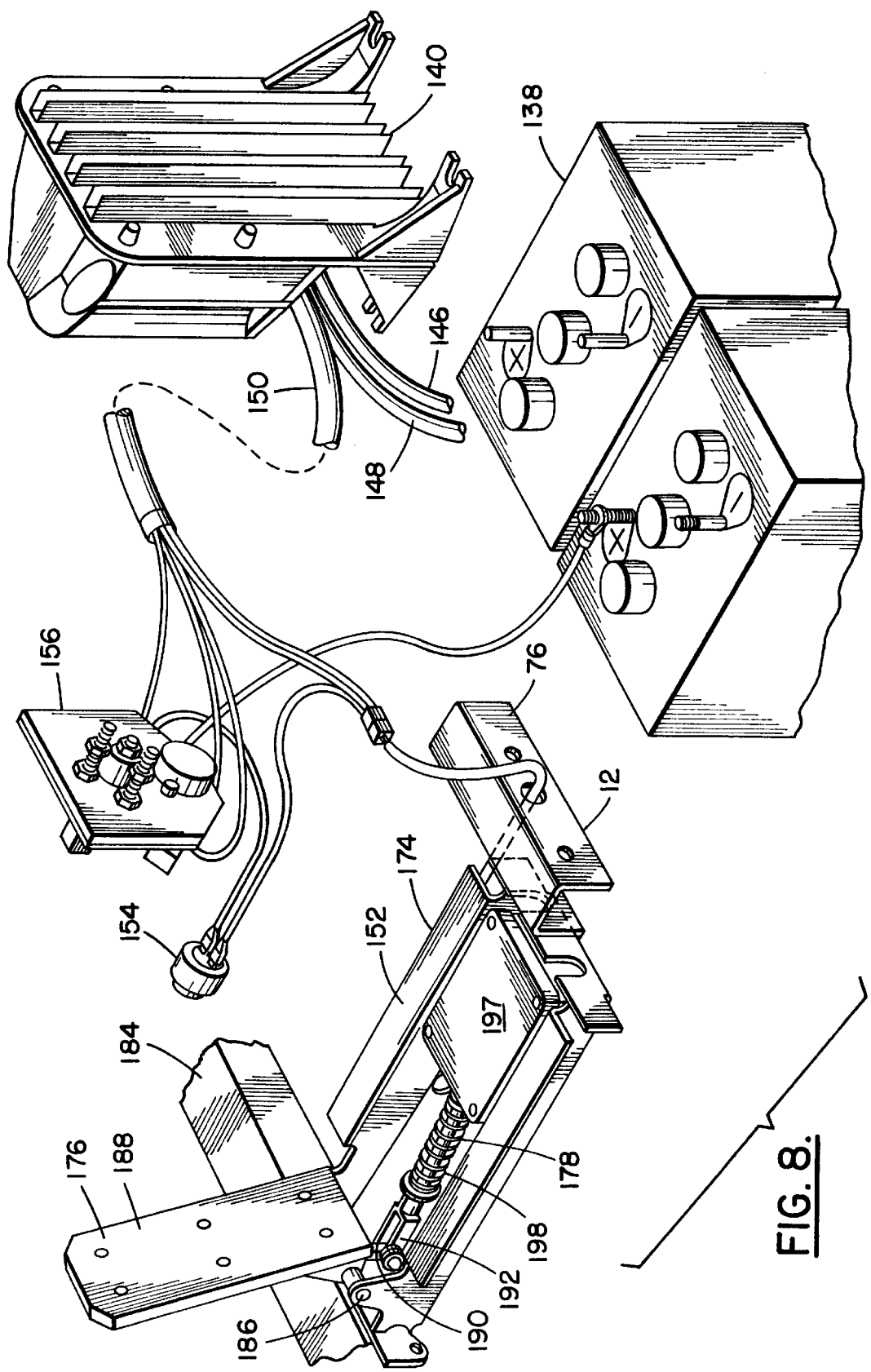
FIG. 8 is a schematic perspective view of an accelerator pedal assembly, switches, speed controller, and batteries for a speed control system of the electric powered car.

Referring now to FIG. 3, the electric powered car has the same chassis 12 as the internal combustion engine powered car. The electric motor drive system includes the electric motor 16, a set of batteries 138, a speed controller 140, and a rear axle assembly 142. The electric motor 16 is directly operably attached to the rear axle assembly 142 at a gear box 144. The rear axle assembly 142 is connected to the chassis by shock absorbers and leaf springs similar to the rear axle assembly 36 of the internal combustion engine powered car. Referring also to FIG. 8, the electric motor 16 is electrically connected to the speed controller 140 by electrical cable 146. Electrical cable 148 electrically connects the batteries 138 to the speed controller 140. Electrical cable 150 electrically connects the speed controller 140 to an accelerator pedal assembly 152, an ignition switch 154, and a forward/neutral/reverse switch 156. The batteries 138 are preferably 6 volt deep cycle batteries. Electricity from the batteries 138 is delivered to the speed controller 140 by cable 148. The speed controller 140 then delivers the electricity, or a portion of the electricity, to the electric motor 16 based upon position of the accelerator pedal assembly 152 and two switches 154,156.

Figure 3B:
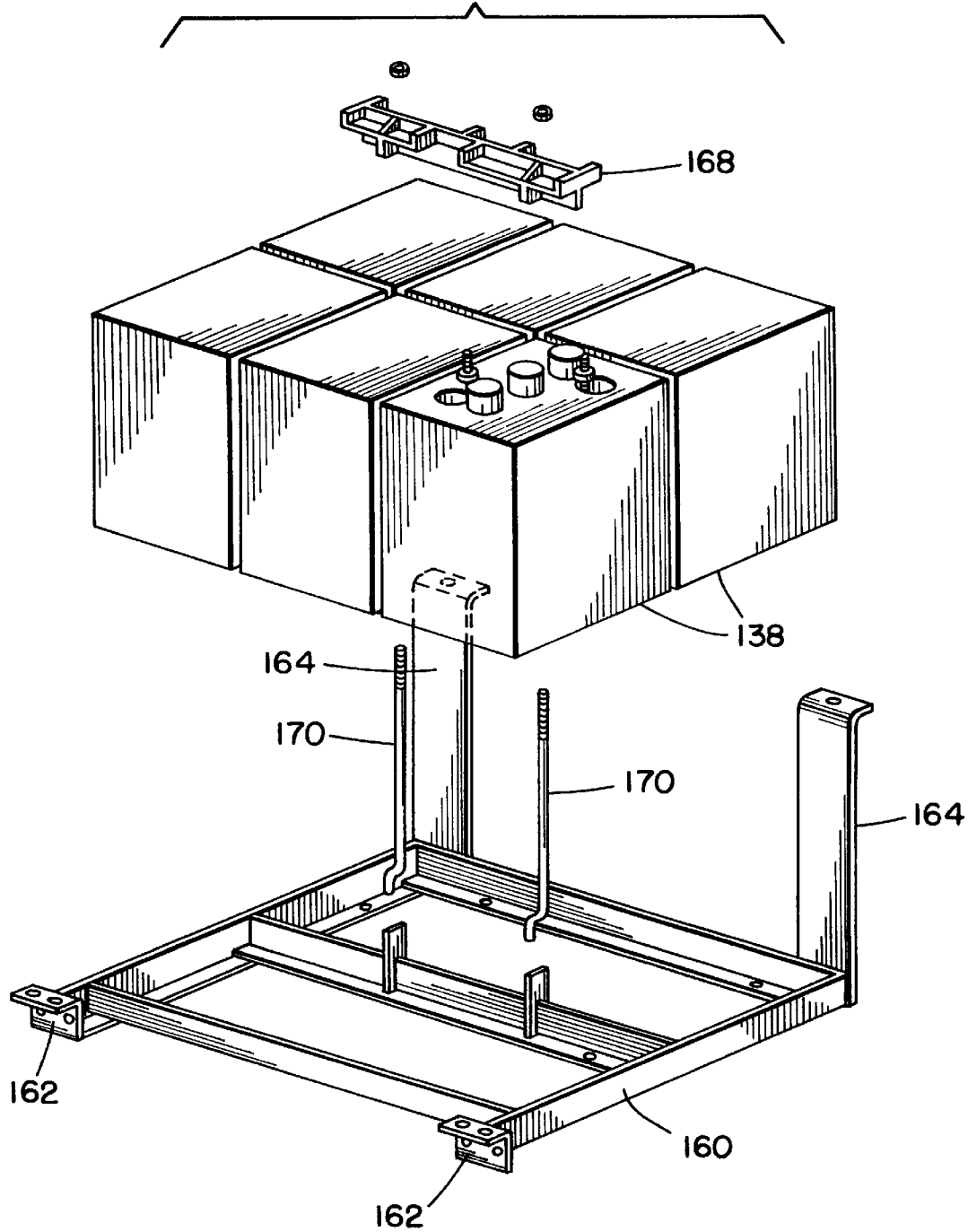
FIG. 3B is an exploded perspective view of the batteries shown in FIG. 3A and the bottom of the battery support structure.

Referring also to FIGS. 3A and 3B, in the embodiment shown, six batteries 138 are provided. However, in alternate embodiments, any suitable number or type of batteries could be provided. The batteries 138 are mounted to the chassis 12 by a battery support structure 158. The battery support structure 158 has a bottom section 160 that is directly attached to the chassis 12. Front sections 162 are attached to the transverse section 76 of the chassis, and rear sections 164 are attached to the second transverse section 166 of the chassis. The bottom section 160 forms a platform that the batteries 138 sit upon. A top positioner 168 is positioned on top of and between the batteries. Connecting rods 170 are used to connect the top positioner 168 to the bottom section 160 to retain the batteries 138 as a unit with the bottom section 160. The battery support structure 158 also has a top section 172 that is connected to the two transverse sections 76, 166. The top section 172 also functions as a support frame for the seat 19 of the car.

Figure 8A:
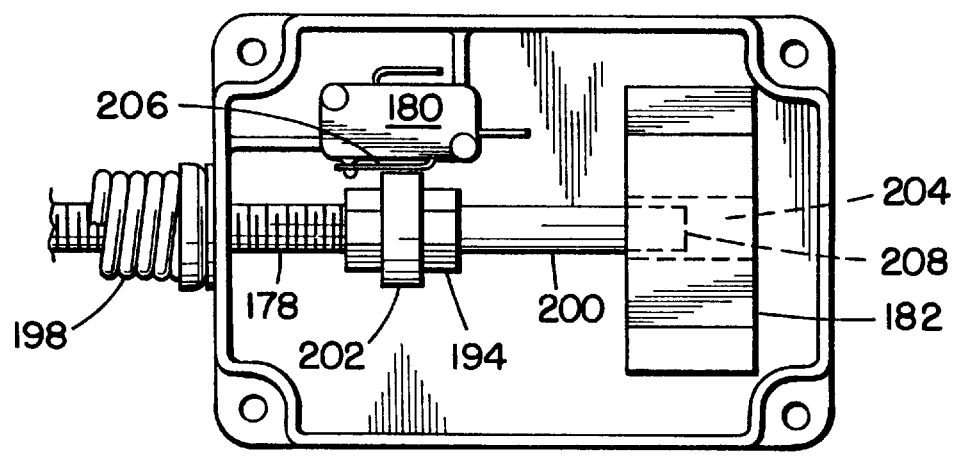
FIG. 8A is a top plan view of a portion of the accelerator pedal assembly shown in FIG. 8 at a first position.
Figure 8B:
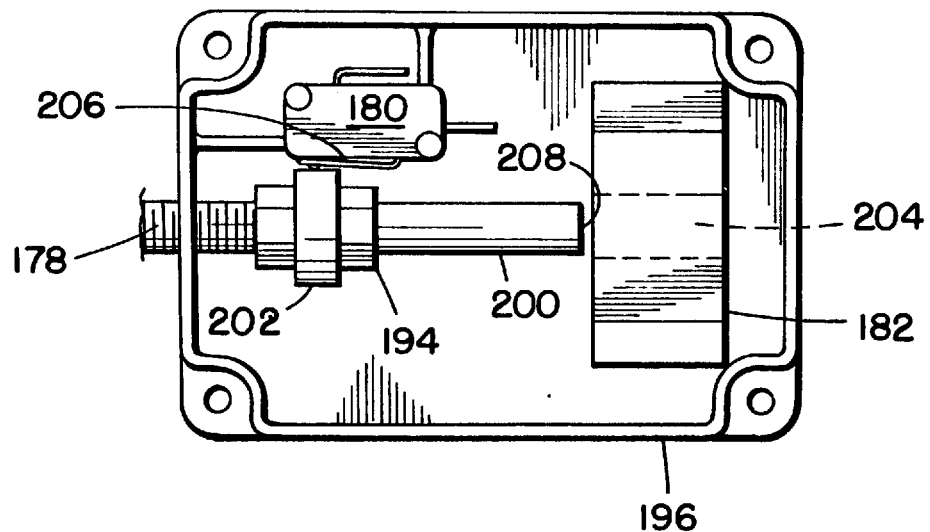
FIG. 8B is a plan top view of the portion of the accelerator pedal assembly shown in FIG. 8A with the actuator rod at a home position.
Figure 9A:
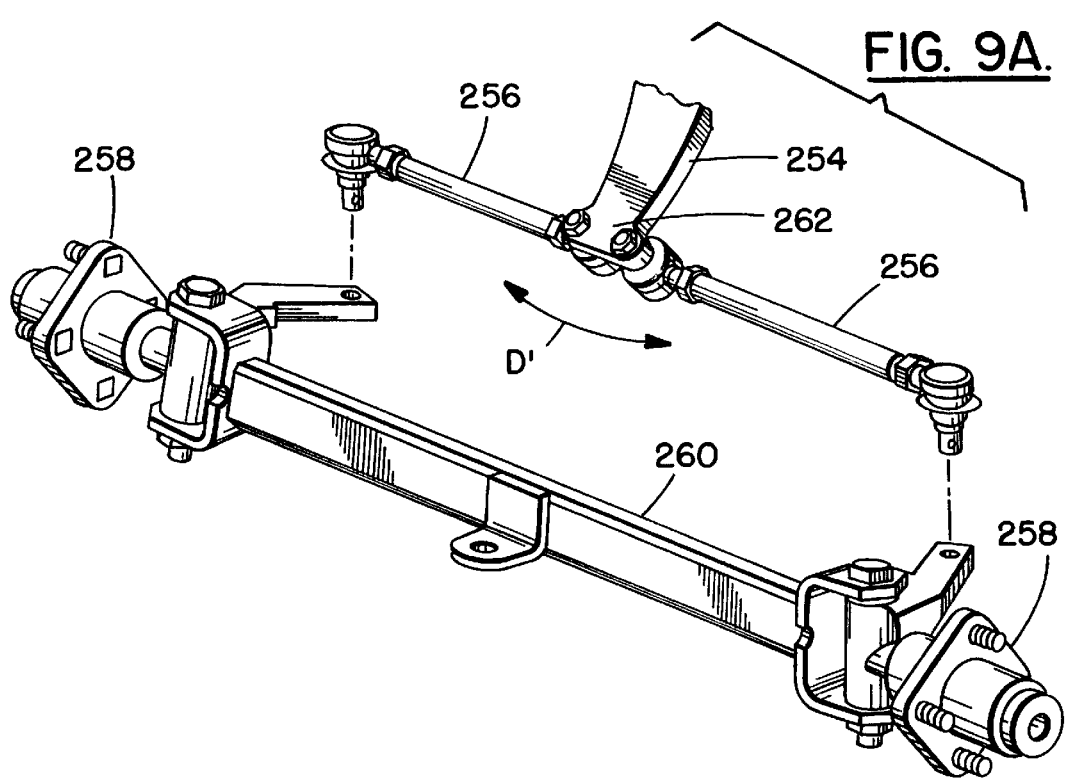
FIG. 9A is a perspective view with a partially exploded section of a front portion of the steering system of the car shown in FIG. 1.
Figure 9B:
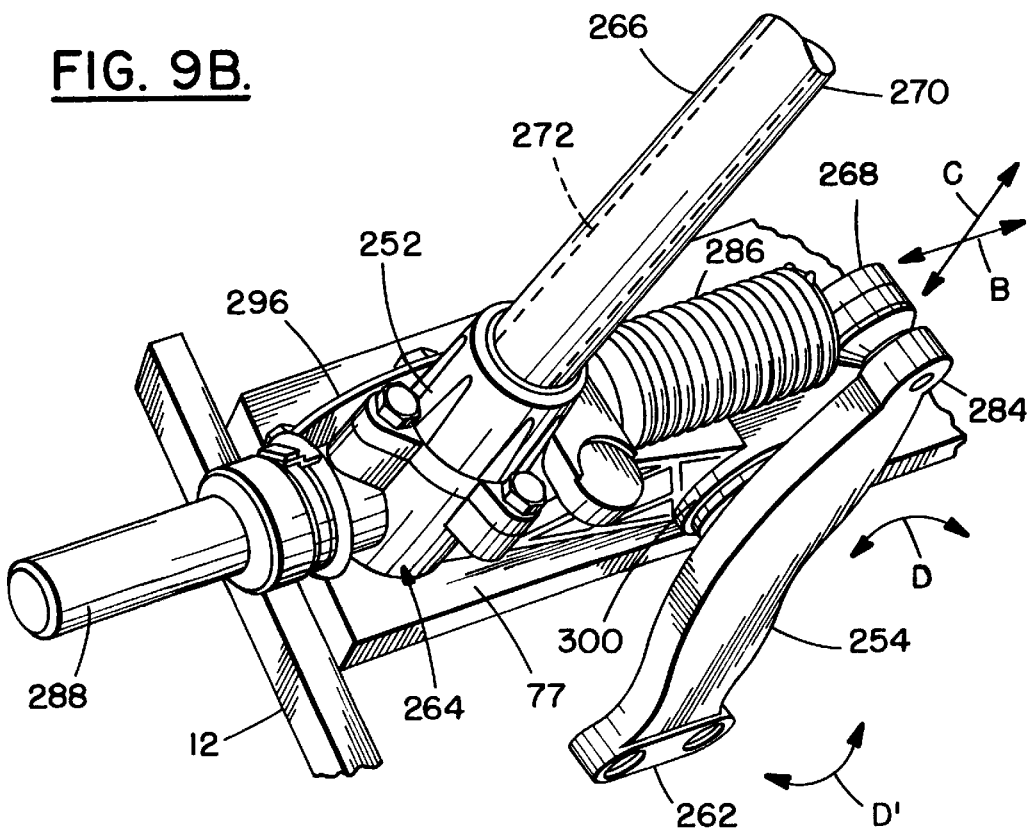
FIG. 9B is a perspective view of the rack and pinion assembly of the steering system used in the car shown in FIG. 1.

Referring to FIGS. 8, 8A and 8B, the accelerator pedal assembly 152 comprises a frame 174, a pedal 176 pivotably mounted to the frame 174, an actuator rod 178, a microswitch 180, and a non-contacting position sensor 182. The frame 174 is directly fixedly attached to the chassis 12 between transverse section 76 and a front transverse section 184. A pivot 186 is provided to pivotably connect the pedal 176 to the front of the frame 174. The pedal 176 has a foot contact section 188 and a cantilevered connection section 190. The actuator rod 178 has a first end 192 pivotably connected to the connection section 190 and a second end 194 located inside an environmental protection enclosure 196 which is fixedly attached to the frame 174. A spring 198 is used to bias the pedal 176 and actuator rod 178 at a home position. The pedal 176 can be pressed by a driver's foot to move the actuator rod 178 from its home position (seen in FIG. 8B), the spring 198 being compressed in the process. The second end 194 of the rod 178 extends into the enclosure 196 and has a ferromagnetic metal section 200 with an attachment collar 202. The ferromagnetic metal section 200 is suitably sized and shaped to be moved in and out of a receiving area 204 in the sensor 182.

The microswitch 180 is electrically connected to the speed controller 140 and is fixedly stationarily attached to the enclosure 196. The microswitch 180 has a contact arm 206 that is adapted to be contacted and moved by the attachment collar 202. FIG. 8B shows the rod 178 at its home position. In this home position, the collar 202 contacts the arm 206 of the microswitch 180. As seen in FIG. 8A, when the pedal 176 is depressed, the rod 178 moves further into the enclosure 196. This moves the rod 178 to thereby move the collar 202 out of contact with the arm 206. This changes the setting of the microswitch 180. Thus, the microswitch 180 is used to signal when the foot pedal 176 is initially depressed from its home position by the driver or when a driver takes his or her foot off of the pedal, the spring 198 biasing the rod 178 back to its home position.

The position sensor 182, in the embodiment shown, is a non-contacting induction sensor that uses a linear voltage displacement transducer. In alternate embodiments, other types of sensors could be used including resistive, capacitive, hall effect transducers, digital, etc. The sensor 182 is electrically connected to the speed controller 140 and is adapted to send an electrical signal to the speed controller 140 corresponding to the position of the ferromagnetic section 200 relative to the sensor 182. The receiving area 204 is adapted to receive the ferromagnetic section 200 therein. As seen in FIG. 8A, when the pedal 176 is depressed, the leading end 208 of the section 200 is projected into area 204. This causes the sensor 182 to generate and send an electrical signal to the speed controller 140. The strength of the signal increases the further or deeper that the section 200 projects into area 204. When the pedal 176 is fully depressed, the section 200 extends fully into the receiving area 204. The speed controller 140 sends electricity to the electric motor 16 based upon the strength of the signal received from the sensor 182. The stronger the signal, the more electricity that is sent to the electric motor 16, and the faster the electric motor operates. Because the section 200 does not make physical contact with the sensor 182, the sensor 182 will not be subjected to physical wear from repeated movement of the actuator rod 178 into and out of the sensor 182. A cover 197 is provided for the enclosure 196 to keep dirt and debris out of the enclosure 196.

Figure 7:
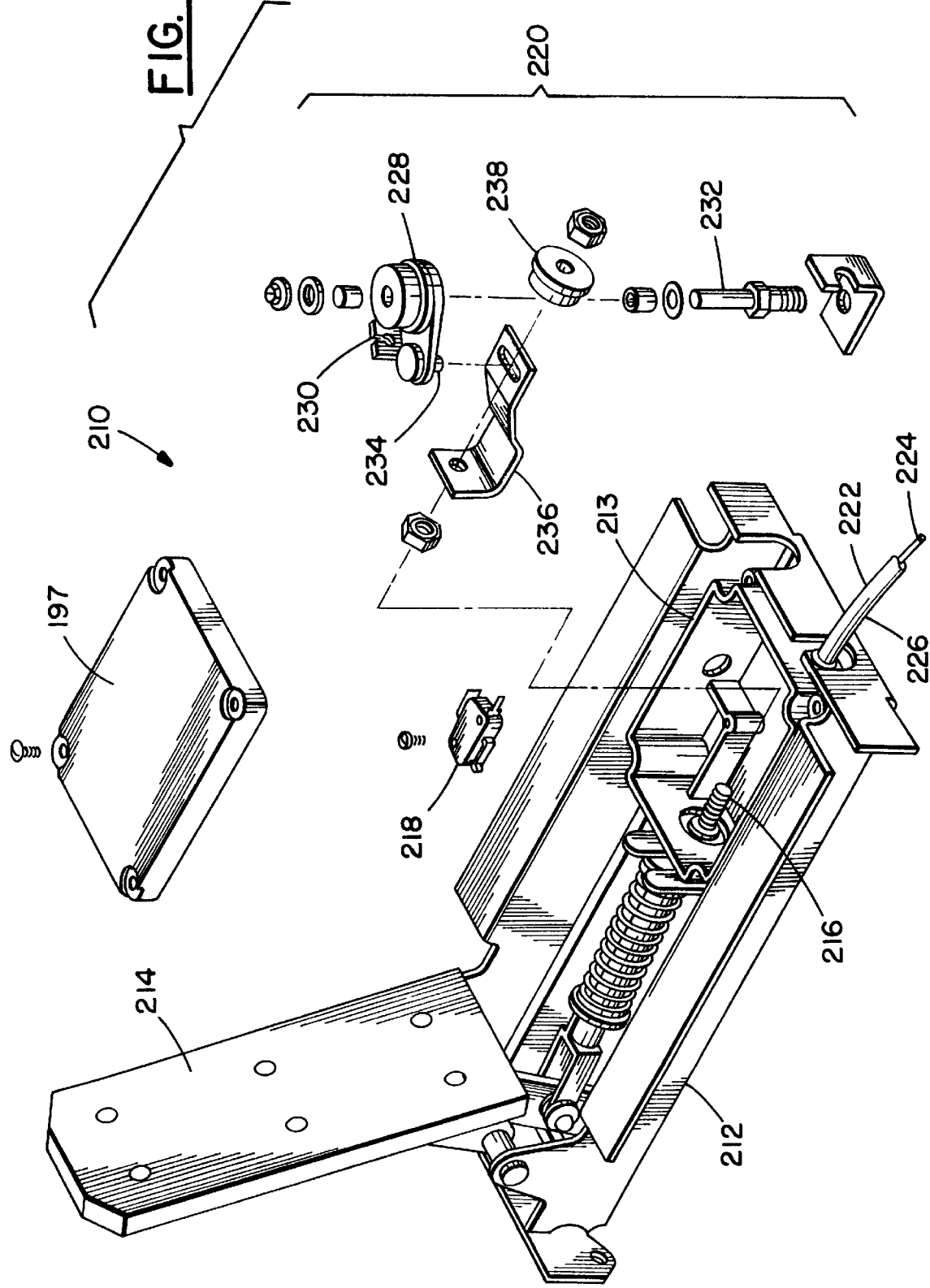
FIG. 7 is an exploded perspective view of an accelerator pedal assembly for the internal combustion engine powered car.

Referring now to FIG. 7, there is shown an exploded view of an accelerator pedal assembly 210 used for the internal combustion engine powered car. The assembly 210 has a frame 212, a pedal 214, an actuator rod 216, a microswitch 218, and a cable connection 220. The frame 212 is adapted to be connected between the two transverse sections 76 and 184 the same as the frame 174 of assembly 152 would be. The assembly 210 is substantially similar to the assembly 152 shown in FIG. 8. However, the second end of the rod 216 is connected to the cable connection 220 to move the cable connection 220 when the pedal 214 is depressed and released. The mechanical cable 222 has an inner cable 224 movably positioned within an outer sheath 226. The sheath 226 is connected to the enclosure 213 and the inner cable 224 extends into the enclosure 213 and is connected to actuator 228 at area 230. Actuator 228 is pivotably connected to the frame 212 by pivot pin 232 that is stationarily connected to the frame 212. The actuator 228 has a pin section 234 operably connected to actuator rod connector 236. The actuator rod connector 236 is connected to the second end of the actuator rod 216. A collar 238 is provided to actuate the microswitch 218. Movement of the actuator rod 216 to and from its home position actuates and deactuates the microswitch 218. The microswitch 218 is electrically connected to the starter/generator 32 by a relay (not shown) to activate the starter/generator 32 when the pedal 214 is depressed and the engine is not running. The other end of the cable 222 is connected to the throttle control system of the engine 14 to control the speed of the car. In alternate embodiments, other types of accelerator pedal assemblies could be provided. Because the frames 174 and 212 of the two accelerator pedal assemblies 210 and 152 are substantially the same and, are designed to connect to the chassis 12 in the same manner, the assemblies 152 and 210 can be pre-assembled as modular units. An assembly line worker can select either one of the assemblies based upon whether the car is internal combustion engine powered or electric powered, and connect the selected assembly to the chassis. This modular interchangeability for assembly of different types of cars (internal combustion engine powered or electric powered) allows the assembly line to be much more responsive to consumer orders and demand by being readily capable of assembling either type of car.

Referring now to FIGS. 1 and 9A–9C, the steering system 22 will be described. The steering system 22 is the same for both the internal combustion engine powered cars and the electric powered cars. This use of a single type of steering system for both types of cars further enhances assembly and reduces inventory, assembly, and manufacturing costs. The steering system 22 includes a steering wheel 250, a rack and pinion assembly 252, an idler lever 254, tie rods 256, spindle assemblies 258, and a front axle 260. The front axle 260 has springs and shock absorbers (not shown) that connect the front axle to the front of the chassis 12. The spindle assemblies 258 are pivotably connected to opposite ends of the front axle 260. The front wheels 20 are connected to the spindle assemblies 258. The tie rods 256 connect the spindle assemblies 258 to the bottom end 262 of the idler lever 254. The rack and pinion assembly 252 has a housing 264, a steering shaft assembly 266, and a driven rack assembly 268. The steering shaft assembly 266 has an outer steering column assembly 270 stationarily connected to the housing 264, and a steering shaft assembly 272 located, at least partially, in the steering column assembly 270. A first end of the shaft assembly 272 is connected to the steering wheel 250. An opposite second end 271 of the shaft assembly 272 has a pinion gear section 274 connected by a coupling 276 to a main shaft 278. The second end 271 is located inside the housing 264. The housing 264 is stationarily connected to the chassis 12 at area 77 (see FIG. 2). The driven rack assembly 268 has a rack portion 280 operably connected to the pinion 274 in the housing 264, and a pivot end 282 pivotably connected to a top end 284 of the idler lever 254 and pivotably connected to rack portion 280. A flexible protective cover 286 is provided between the housing 264 and driven rack assembly 268 to protect the assembly from contamination, such as from dirt. A second cover 288 is provided at the opposite end of the housing 264. When the shaft 278 is rotated as indicated by arrow A in FIG. 9C, the driven rack assembly 268 moves as indicated by arrow B in FIG. 9B. The driven rack assembly 268 is sufficiently compensating to allow the pivot end 282 to move slightly up and down, as indicated by arrow C in FIG. 9B. This compensates for the slightly arced path, indicated by arrow D in FIG. 9B, of the top end 284 of the idler lever 254. The driven rack assembly 268 is adjustably mounted in the housing 264 by a sleeve bearing 290 and a rack guide 292 located against the back of the rack portion 280. A plate 296 attached to the housing 264 keeps the spring 294 biased against the rack guide 292. This bias by the spring 294 provides the required force to maintain proper gear mesh between the rack section 280 and pinion gear 274 while compensating for manufacturing tolerances and wear. In alternate embodiments, other types of adjusting connections could be provided.

The idler lever 254 has a center section with a pivot 298. The housing 264 has an integral idler lever mount 300. The center section 298 is pivotably located in the lever mount 300 with a flanged bearing 302. Thus, when the driven rack assembly 268 moves the top end 284 of the idler lever 254 as indicated by arrow D, the bottom end 262 of the idler lever 254 will move as indicated by arrow D'. One of the unique features of the steering system 22 is that, unlike prior steering assemblies that use a housing for the rack and pinion assembly and a separate mount for the idler lever, the idler lever mount 300 is integral with the housing 264. This makes the steering system easier to assemble and install in the car. In addition, the steering system has a more responsive and tighter feel to the driver. The quality of the steering system is also improved. The steering assembly described above can be preassembled and then merely attached to the chassis 12 as a modular unit. This can obviously reduce manufacturing complexity. In alternate embodiments, other types of steering systems could be provided.

Figure 10:
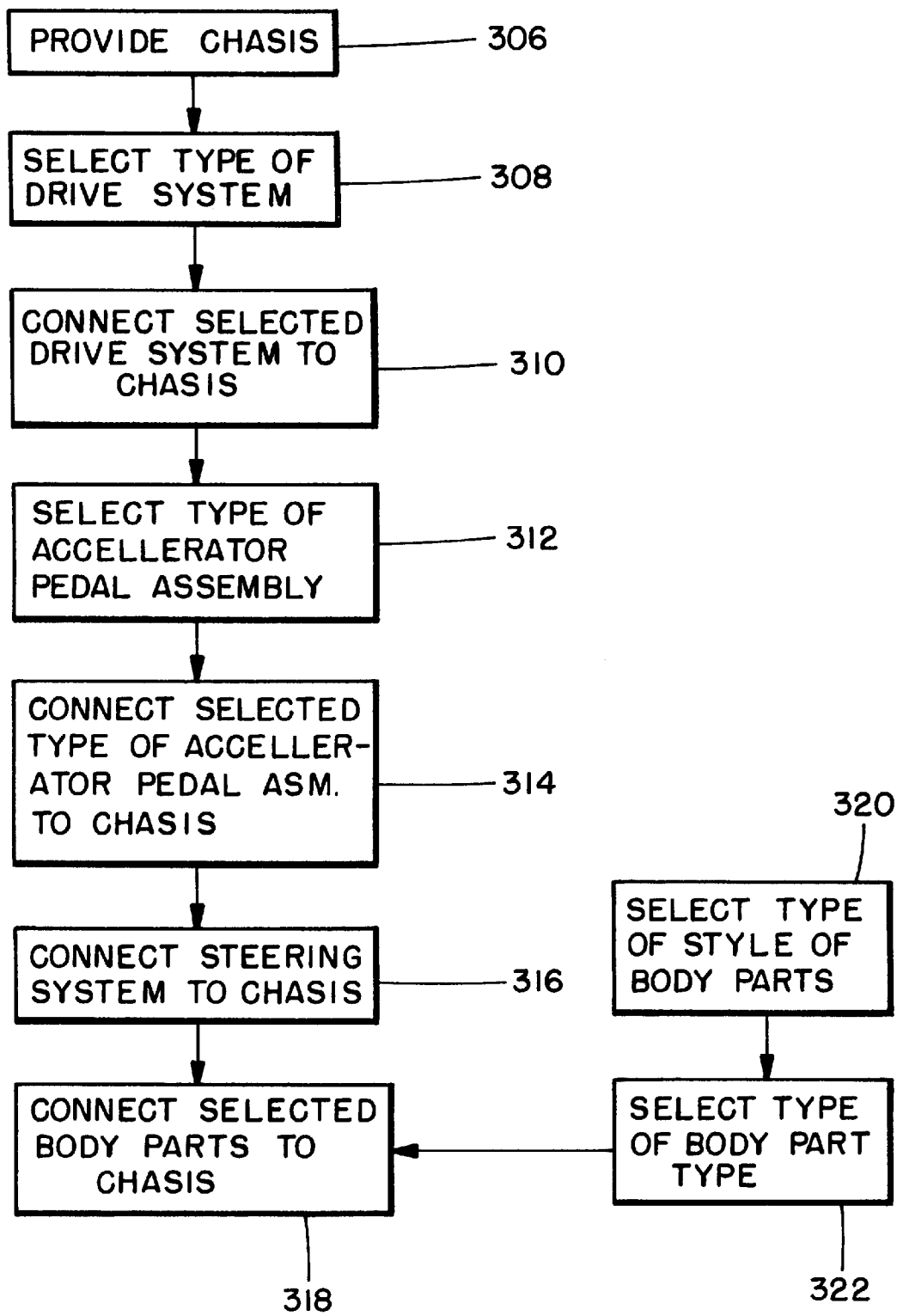
FIG. 10 is a flow chart of an assembly method used to assembly cars according to the present invention.

The use of a single type of chassis 12 for both internal combustion engine powered and electric powered cars provides advantages and benefits over the prior manufacturing technique of using a separate and different chassis for each of the two types of cars. One advantage is that a single assembly line can be used to simultaneously manufacture both types of cars. Assemblers can select a type of drive system from a group of drive system types consisting of electric motor drive systems and internal combustion engine drive systems and, connect the selected type of drive system to the chassis in its drive system receiving area. This type of assembly method can reduce inventory, reduce assembly time, and improve assembly plant efficiency. The chassis 12 has been suitably constructed to alternatively receive either the electric motor drive system or the internal combustion drive system substantially entirely in the drive system receiving area 304. For the electric motor drive system, this includes positioning the set of batteries 138, electric motor 16, and rear axle assembly 142 substantially entirely in the drive system receiving area 304. For the internal combustion engine drive system, this includes positioning the internal combustion engine drive system substantially entirely in the drive system receiving area 304. Referring also to FIG. 10, a flow chart of such an assembly line method is shown. The flow chart is not a complete flow chart of all the steps involved in assembling golf cars, but is intended to highlight novel features. A chassis is provided as indicated by box 306 that is adapted to have either an electric motor drive system or an internal combustion engine drive system connected to it. A type of drive system is selected as indicated by box 308. The selected drive system is then connected to the chassis as indicated by box 310. A type of accelerator pedal assembly is selected based upon whether the drive system is electric or internal combustion engine powered as indicated by box 312. The selected accelerator pedal assembly is then connected to the chassis as indicated by box 314. The steering system is connected to the chassis as indicated by box 316. The body parts are connected to the chassis as indicated by box 318. Before the body parts are connected to the chassis, body parts can be selected based upon style and type. Two styles of golf cars are produced; a fleet car style and a personal car style. Fleet car style is a style most commonly purchased and used for fleets of cars such as on golf courses; the cars being rented to golfers. The fleet car style is shown in FIG. 1. The personal car style is a style of car purchased and used by individuals that includes enhanced features such as headlights, tail lights, more stylish body part shapes, etc. A type of personal car style can be seen in U.S. Pat. No. Des. 345,717 which is hereby incorporated by reference in its entirety. A type of fleet car style can also be seen in U.S. Pat. No. Des. 345,717 which is hereby incorporated by reference in its entirety.

Golf cars are also produced with different types of body part types; namely, metal body parts and plastic or polymer body parts. In the past, golf car chassis were provided to have metal body parts connected to it or plastic body parts connected to it, but not alternatively. In other words, cars with metal body parts had one type of chassis and cars with plastic body parts had a different type of chassis.

The chassis and body parts types for the cars of the present invention have been designed such that the chassis 12 can have either metal body parts or non-metal body parts connected to it. Therefore, in the method of FIG. 10, a type of style of body parts is selected from a group of body part styles consisting of a fleet car style and a personal car style, (see box 320), a type of body part type is selected from a group of body part types consisting of metal body parts and non-metal body parts (see box 322), and the selected body parts are connected to the chassis as indicated by box 318. Of course, in alternate embodiments, the method described with reference to FIG. 10 could be modified or changed. As noted above, one of the features achieved with the assembly of the cars described above is enhanced adaptability of a single assembly line to produce different types and styles of cars. This is accomplished by making the different types and styles of different components interchangeable. This provides for simultaneous assembly of all permutations of the golf cars on one assembly line. It also insures a steady working assembly line regardless of the varying consumer demand of the different types and styles of the golf cars.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method of assembling a golf car comprising steps of:
   providing a golf car chassis having a general block shaped drive system receiving area;
   selecting a type of drive system from a group of drive system types consisting of an electric motor drive system and an internal combustion engine drive system; and
   connecting a drive system of the selected type of drive system to the chassis in the drive system receiving area.

2. A method as in claim 1 wherein the electric motor drive system includes a set of drive batteries, an electric motor, and a rear axle assembly connected to the electric motor, the step of connecting the electric motor drive system includes positioning the set of drive batteries, electric motor and rear axle assembly substantially entirely in the drive system receiving area.

3. A method as in claim 1 wherein the internal combustion engine drive system includes an internal combustion engine, and a rear axle assembly connected to the engine, the step of connecting the internal combustion engine drive system includes positioning the internal combustion engine and rear axle assembly substantially entirely in the drive system receiving area.

4. A method as in claim 1 further comprising:
   selecting a type of body parts from a group of body part types consisting of metal body parts and non-metal body parts; and
   connecting body parts of the selected type of body parts to the chassis.

5. A method as in claim 1 further comprising:
   selecting a type of style of body parts from a group of body part styles consisting of a fleet car style and a personal car style; and
   connecting body parts of the selected type of style of body parts to the chassis.

6. A method of assembling a golf car comprising steps of:
   providing a golf car chassis;
   selecting a type of drive system from a group of drive systems, the group of drive systems comprising an electric motor type and an internal combustion engine type;
   connecting a drive system of the selected type of drive system to the chassis;
   selecting a style of body from a group of body styles, the group of body styles including a fleet car style and a personal car style; and
   connecting body parts of the selected style of body to the chassis.

7. A method of assembling a land vehicle comprising steps of:
   providing a vehicle chassis;
   selecting a drive system from a group of drive systems, the group of drive systems comprising an electric motor type and an internal combustion engine type; and
   connecting the selected drive system to the chassis.

* * * * *

UNITED STATES PATENT AND TRADEMARK OFFICE
CERTIFICATE OF CORRECTION

PATENT NO. : 5,836,412
DATED     : November 17, 1998
INVENTOR(S) : Lyles

It is certified that error appears in the above-identified patent and that said Letters Patent is hereby corrected as shown below:

On the title page, item [75] Inventors: should read
　　-- Thomas W. Lyles, Martinez, Ga. -- item [19] should read -- Lyles --

Signed and Sealed this

Second Day of March, 1999

Attest:

Q. TODD DICKINSON

*Attesting Officer*　　　*Acting Commissioner of Patents and Trademarks*